(12) United States Patent
Kranawetter

(10) Patent No.: US 6,205,250 B1
(45) Date of Patent: Mar. 20, 2001

(54) SYSTEM AND METHOD FOR MINIMIZING CLOCK CYCLES LOST TO OVERHEAD DATA IN A VIDEO DECODER

(75) Inventor: Greg Alan Kranawetter, San Jose, CA (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/140,993

(22) Filed: Aug. 27, 1998

(51) Int. Cl.[7] .............................. G06K 9/64; A04N 11/02
(52) U.S. Cl. ........................................ 382/232; 348/420.1
(58) Field of Search .................................. 382/232–235, 382/236, 238, 251, 239, 241, 242, 247, 248; 370/216, 16, 338; 348/384.1, 390.1, 393.1, 394.1, 420.1

(56) References Cited

U.S. PATENT DOCUMENTS 4,451,916 * 5/1984 Casper et al. ............................ 370/16
5,416,615 * 5/1995 Shirota ................................... 358/530

OTHER PUBLICATIONS

Ang., et al., "Video Compression makes big gains", IEEE Spectrum, Oct. 1991, pp. 16–19.
Jain, "Fundamentals of Digital Image Processing", Prentice– Hall International, Inc., 1989, pp. 476–498.

* cited by examiner

Primary Examiner—Jose L. Couso
Assistant Examiner—Duy M. Dang
(74) Attorney, Agent, or Firm—Joseph S. Tripoli; Joseph J. Laks; Ronald H. Kurdyla

(57) ABSTRACT

A video processing device capable of minimizing clock cycles lost to overhead information includes an encoder for generating first and second groups of overhead bits. The first group includes a fixed number of overhead bits and the second group includes a variable number of overhead bits. A shift register receives pixel data from a data source, receives the second group of overhead bits from the encoder, and provides output of the pixel data and the second group of overhead bits. A multiplexer receives the pixel data and the second group of overhead bits from the shift register, receives the first group of overhead bits from the encoder, and provides output of the pixel data and the first and second groups of overhead bits which are then combined in an output register.

10 Claims, 4 Drawing Sheets

SYSTEM AND METHOD FOR MINIMIZING CLOCK CYCLES LOST TO OVERHEAD DATA IN A VIDEO DECODER

FIELD OF THE INVENTION

The present invention generally relates to digital video processors. More particularly, the present invention relates to a system for encoding and decoding image representative picture elements ("pixels" or "pels") in a block-based image processor.

BACKGROUND OF THE INVENTION

Memory management and memory reduction are important aspects in the design and operation of image processors. For example, television systems may use image processors using the MPEG-2 Standard. The MPEG (Motion Picture Experts Group) signal compression standard (ISO/IEC 13181-2, May 10, 1994) is a widely accepted image processing standard which is well-suited for satellite, cable and terrestrial broadcast systems employing high definition television (HDTV) processing among other forms of image processing. HDTV receivers require 96 megabits or more of memory to temporarily store decoded MPEG video frames prior to display, as part of the process of motion estimation and compensation for accurate image reconstruction.

Systems which reconstruct images from decoded MPEG information typically employ Differential Pulse Coded Modulation (DPCM). In DPCM, processing as typically used in an MPEG decoder, a processor generates a prediction from the actual pixel value resulting in a difference. This difference, known as the prediction error, is generally smaller than the original pixel or prediction values, so quantizing and storing the difference rather than the original pixel value saves memory. Ang, et al., "Video Compression Makes Big Gains," IEEE Spectrum, October, 1991, describes an MPEG encoder and decoder.

During decoding, a dequantizer regenerates substantially the same prediction from previously decoded pixels. Only a difference value and the prediction are needed to decode and reconstruct the current pixel. The prediction is often partially or wholly based on the previous pixel, which itself was decoded and reconstructed form the preceding pixel. For a more complete description of such predictors and their operation, see Jain, A., *Fundamentals of Digital Image Processing*, Prentice-Hall, Inc., p. 484 (1989).

Accurately representing the first pixel in a block during image block compression avoids propagating prediction error throughout the entire block of pixels. In smooth areas, (e.g., a display area which has subtle changes in color, objects or the like), noise contamination of the first pixel may produce artifacts which a viewer may find unacceptable. Therefore, the first pixel processed should be represented by a sufficient number of bits when stored in memory to ensure accurate image reconstruction. In this operation, overhead bits are stored at the beginning of each compressed block of pixel data. Processing these overhead bits usually requires extra clock cycles, or alternatively, additional circuitry.

SUMMARY OF THE INVENTION

The present invention provides a video processing system using a method of stripping a predetermined number of overhead bits from a data block while producing a pixel for each clock cycle, but at the same time not increasing the size of a shift register or decreasing bandwidth. A system according to the present invention satisfies these objectives. The present invention is described in detail below, with reference to the drawings.

DETAILED DESCRIPTION OF THE INVENTION

Figure 1:
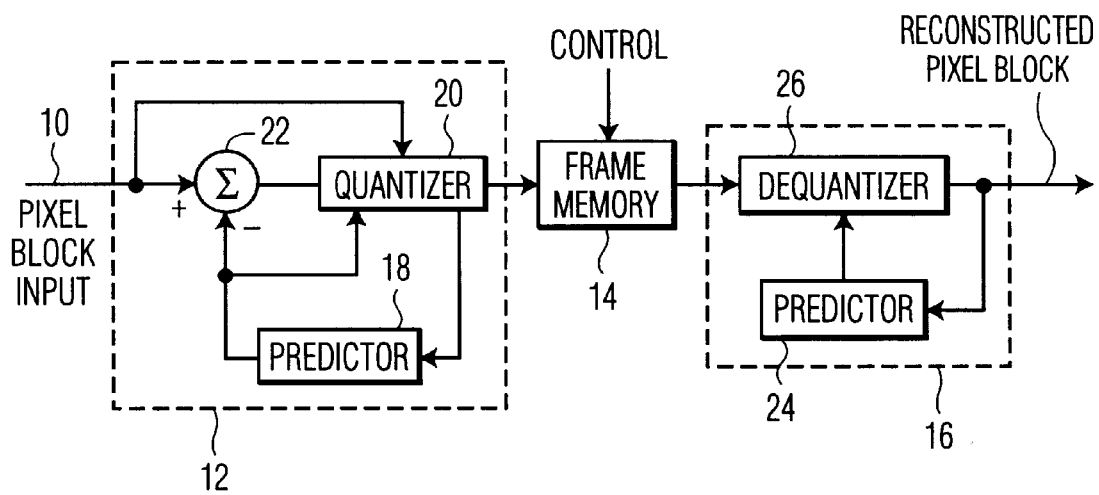
FIG. 1 shows a block diagram of a pixel block processor including apparatus according to the present invention.

In FIG. 1, an MPEG decoder provides a block of MPEG decoded pixel data to a compressor 12. Compressor 12 includes a predictor 18, a quantizer 20, and a combiner 22. Predictor 18 may be of the type described in Jain, A., *Fundamentals of Digital Image Processing*, Prentice-Hall, Inc., p. 484 (1989), for example.

Quantizer 20 quantizes the pixel block values and provides a data reduced pixel block to memory 14. When the display processor (not shown) accesses the reduced data block in memory 14 for image display, decompressor 16 reconstructs the original pixel block. Decompressor 16 includes predictor 24 and dequantizer 26 to retrieve reduced data from memory 14 and to reconstruct the reduced data block. Quantizer 20 and dequantizer 26 are arranged according to the principles of the present invention as will be discussed. Predictor 24 is of the same type as predictor 18.

Input 10 of the compressor 12 receives a pixel block from an MPEG decoder, which will be discussed in connection with FIG. 6. The pixel block is in the spatial domain, and comprises an 8×8 block of image pixels, for example. Input 10 supplies the pixel block data to a non-inverting input of combiner 22 and to quantizer 20. The output of predictor 18 supplies pixel prediction data to an inverting input of combiner 22 and to quantizer 20. Combiner 22 combines signals from its inverting and non-inverting inputs and provides the difference to quantizer 20. Quantizer 20 outputs quantized pixel values to predictor 18. Quantizer 20 also outputs quantized pixel difference values for storage in memory 14.

Figure 2:
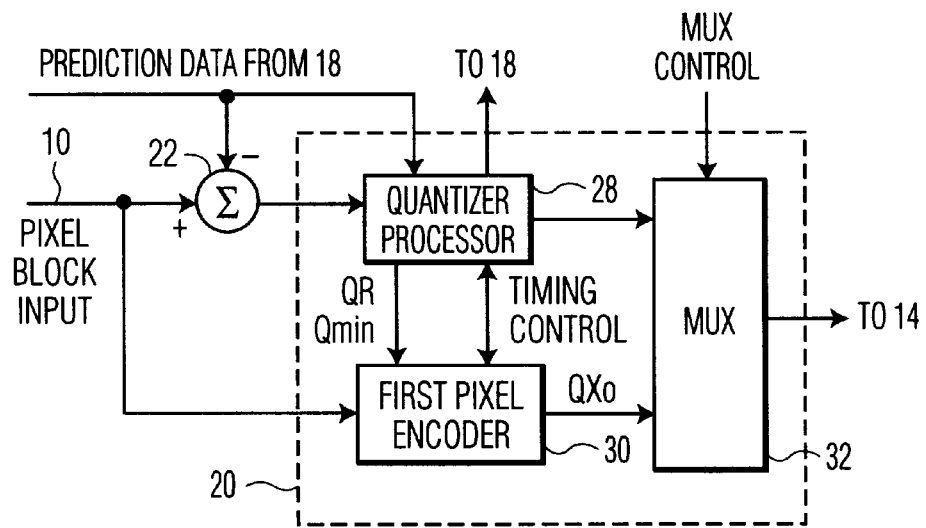
FIG. 2 shows details of an encoder portion of the FIG. 1 system preceding storage in memory.

FIG. 2 illustrates quantizer 20 in greater detail. The same reference numbers identify elements common to FIGS. 1 and 2. Specifically, quantizer 20 includes first pixel encoder 30, multiplexer 32 and quantizer processor 28. Input 10 provides the block pixel data to first pixel encoder 30, which operates upon a predetermined reference pixel of the pixel block. The term "first pixel" does not specifically refer to any particular preferred pixel position. "First pixel" refers to that pixel within a block of pixels which will be used initially in a predictor for reconstructing the pixel block. Therefore, the pixel becomes a reference pixel for all subsequently reconstructed pixels of a compression network employing a predictor.

First pixel encoder 30 has two primary functions. The most important function is to quantize the reference pixel. The second function is to reduce the storage requirements of frame memory 14 by reducing the number of bits required to represent the quantized value of the reference pixel. These functions are discussed later. If quantization of the reference pixel is lossless or near lossless, the pixel can be retrieved from memory 14, reconstructed with little or no error and used as a prediction value for the remaining pixels in the quantized block. Using an accurate prediction value initially in the prediction process prevents a prediction bias error from propagating throughout the entire reconstructed pixel block.

Reducing the number of bits required to store the quantized reference pixel reduces the size and cost of memory 14. Encoder 30 reduces the number of bits required to represent the quantized reference pixel by one to five bits in this example. Although this amount may seem insignificant, when considered in the context of a high definition television image frame which may contain more than 32,600 8×8 pixel blocks, every bit saved results in a significant savings in memory. These savings become more significant when multiplied by the number of television receivers produced by a manufacturer.

A potential conflict exists between accurately representing the reference pixel value and representing all pixels including the reference pixel with as few bits as possible. An obvious savings occurs if memory is reduced by fifty percent, which translates into eight-bit pixel words being compressed to four bits. Using four bits to represent the reference pixel may induce significant error in the course of prediction processing. Since an accurate reference pixel representation is important to beginning the prediction process, using more bits, when necessary, than the average number of bits used to represent the remaining pixels is worthwhile. Therefore memory reduction is secondary to accuracy relative to the reference pixel.

For the remaining pixels in a block, memory reduction is more important than the accuracy of any one pixel. Encoder 30 may represent each pixel processed as a word containing from three to seven bits. It is impractical to attempt to determine the amount of frame memory that will actually be used to store image frames for any given broadcast signal because of the randomness involved. Therefore memory would have to accommodate the maximum word length (seven bits) for each pixel processed by encoder 30 if it processes all pixels.

First pixel encoder 30 receives the minimum block pixel value from quantizer processor 28. Quantizer 28 receives pixel difference data from combiner 22 and predictor 18, and sends quantized data to predictor 18. Both quantizer 28 and encoder 30 send quantized data to multiplexer 32. Multiplexer 32 sends sequenced quantized data to memory 14 (FIG. 1) as will be discussed subsequently.

Figure 3:
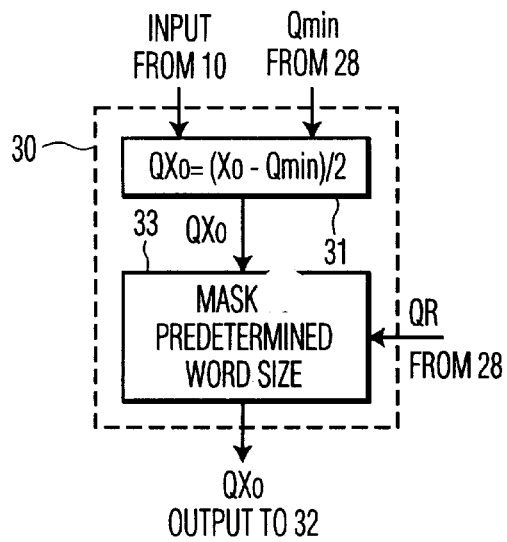
FIG. 3 shows a flow chart of a reference pixel encoding process.

FIG. 3 is a flow chart of the first pixel encoding process performed by encoder 30. In step 31, encoder 30 processes the original first pixel value ($X_o$) from input 10, and the quantized minimum pixel block value ($Q_{min}$) from unit 28 to produce a quantized first pixel value ($QX_O$). Step 31 operates according to the following equation:

$$QX_o = (X_o - Q_{min})/2, \quad (1)$$

Pixels values received at input 10 (FIG. 1) from an MPEG decoder are integers. Therefore, quantizer processor 20 and first pixel encoder 30 receive and output data representative of integers, including $Qx_o$. The advantage of using integers is faster data transfer between elements, faster processing within processors, and less complicated hardware and software. Since $X_o$ began as an integer when received by first pixel encoder 30 from the MPEG decoded signal, data loss will occur only if $X_o-Q_{min}$ is an odd number. An odd number divided by two always has a remainder of 0.5. If the system stores only the integer portion, then the remainder is lost and is unavailable for reconstructing an image.

First pixel encoder 30 divides by two because a divisor of two immediately decreases by one, the number of pixels required to represent the integer portion of the result. Using a larger devisor may save more bits but induces greater error. It has been observed that dividing by two results in a displayed image which is substantially unaffected by the above compression technique.

Encoding the first pixel reduces the eight-bit original pixel by one to five bits in step 33. Determining how many bits to use to represent the encoded first pixel depends upon the value of the quantized range, QR. Quantizer 28 (FIG. 2) calculates QR using the expression $$QR = Q_{max} - Q_{min} + 1, \quad (2)$$

where $Q_{max}$ represents the quantized maximum value in the pixel block. The quantized range QR is chosen as an indicator for setting the number of bits allocated to represent the value of the encoded first pixel because the number of bits needed to represent the value of the encoded first pixel is less than the number of bits needed to represent the value of the quantized range, as is now explained.

Quantizer processor 28 processor 28 produces a quantized minimum value which is less than the original pixel block minimum value, and a quantized maximum value which is greater than the original pixel block maximum value. Therefore, the following relationship exists:

$$Q_{min} \leq X_o \leq Q_{max}, \quad (3)$$

where $X_o$ represents any pixel value within the pixel block currently being processed. Equation (3) may be restated as follows by incorporating equation (2):

$$Q_{min} \leq X_o \leq Q_{max} + QR - 1, \quad (4)$$

Subtracting $Q_{min}$ from all three parts of equation (4) produces the following equation:

$$Q_{min} \leq X_o - Q_{min} \leq QR - 1, \quad (5)$$

Since encoded first pixel $QX_o$ is one half of $X_o-Q_{min}$ (equation 1), $QX_o$ requires one less bit for storage in memory 14 (in a binary system) than the quantized range QR requires. Therefore, quantizer 28 allocates one less bit than is needed to represent QR when determining the word size required to represent and store the encoded first pixel value.

Continuing with FIG. 3, first pixel encoder 30 masks $QX_o$ by the appropriate number of bits for the current range and transfers the desired bits to multiplexer 32. The masked bits of $QX_o$ from step 33 are sent to multiplexer 32 which holds $QX_o$ until it is transferred to memory 14. Control and timing for this operation are discussed in association with FIG. 6.

Figure 4:
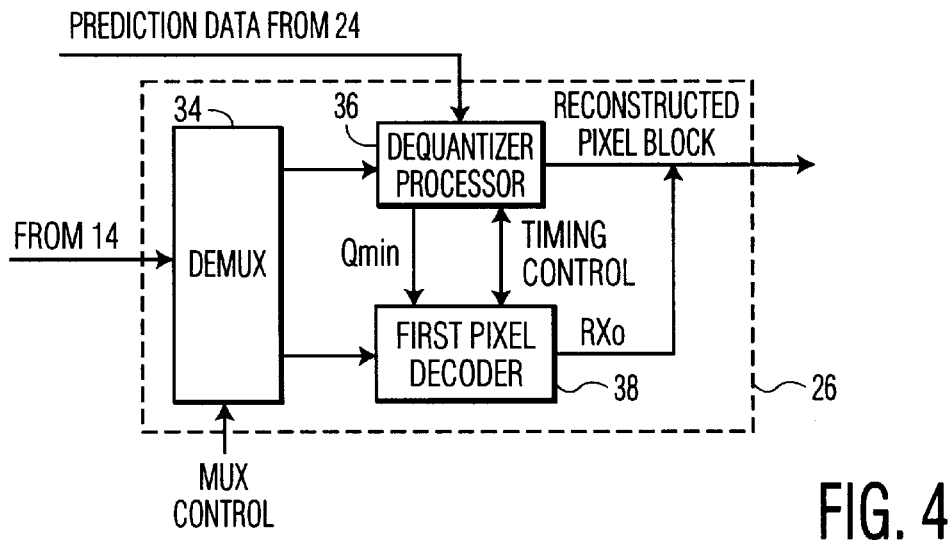
FIG. 4 shows details of a decoder portion of the FIG. 1 system after storage in memory.

FIG. 4 shows the arrangement of first pixel decoder 38, demultiplexer 34 and dequantizer processor 36 within dequantizer 26. Demultiplexer 34 conveys the data from memory 14 to first pixel decoder 38 and to dequantizer processor 36. First pixel decoder 38 decodes the first pixel to its quantized value as supplied to input 10 (FIG. 1) from the MPEG decoded signal. The reconstructed first pixel is conveyed to utilization circuits on a data bus along with the other reconstructed pixels of the pixel block form dequantizer 36.

Dequantizer 36 receives prediction data from predictor 24 (FIG. 1), and the other quantized pixel values from demultiplexer 34. Dequantizer 36 reconstructs the remaining pixel block value to match the original bits per pixel size provided to input 10 (FIG. 1) and outputs the reconstructed values. Timing control from a local microcontroller causes the decoded reference pixel from first pixel decoder 38 and reconstructed pixel data from dequantizer 36 to appear on a data bus at the appropriate time as needed by a display processor, as seen in FIG. 6.

With any DPCM prediction network, the accuracy of the first data point used by the predictor, such as predictor 24, is critical to the accuracy of all data which is subsequently produced by the prediction network for a block of data. Each data point within the block is built upon preceding data points by the prediction network. The dequantized data represents the difference between the preceding data point and the current data point. During reconstruction, this difference is added to the preceding reconstructed data point to attain the current data point. Therefore, any error introduced in the first data point will propagate as a prediction error for subsequent data points within the same block.

Figure 5:
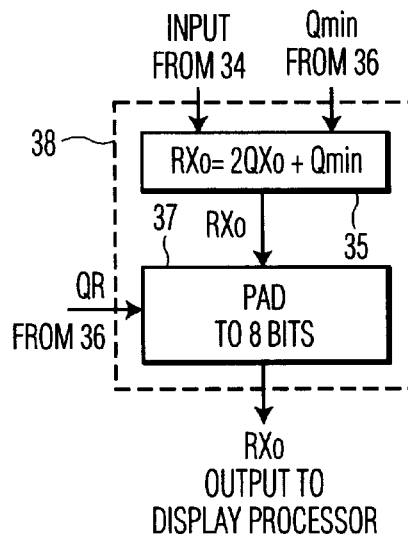
FIG. 5 shows a flow chart of a reference pixel decoding process.

FIG. 5 is flow chart of the first pixel decoding process. In step 35, decoder 38 performs a decoding operation in accordance with the expression:

$$RX_o = 2QX_o + Q_{min}, \quad (6)$$

where $RX_o$ represents the decoded first pixel value. $QX_o$ and $Q_{min}$ are the same as in equation (1).

Equation (6) represents the inverse of the operation represented by equation (1). Equation (1) is a divide-by-two operation, and equation (6) is a multiply-by-two operation. Since first pixel decoder 38 multiplies the encoded first pixel by two during decoding, the maximum error in the reconstructed first pixel value is numerically one less than the original value of the first pixel. This occurs only if $X_o - Q_{min}$ is an odd number, because first pixel encoder 30 keeps only the integer portion of the pixel value during its encoding process. If $X_o - Q_{min}$ is an even number, the decoded first pixel value equals the original first pixel value.

After first pixel decoder 38 calculates the first pixel value $RX_o$ in step 35, $RX_o$ is padded with leading zeroes to attain the pixel word size required by the display processor in step 37. Generally, this is eight bits. In step 37, first pixel decoder 38 adds zeroes to the left of the most significant bit of $RX_o$ until it is an eight bit word. All bits added during this operation are zero (0) so as not to introduce error to the value. Reconstructed first pixel value $RX_o$ is output to the display processor.

Because compressor 12 and decompressor 16 perform inverse operations, system architecture and construction are simplified. Also, encoder 30 in step 31 and decoder 38 in step 35 employ inverse operations which may be implemented by simple bit shifting using known shifting techniques.

Referring again to FIG. 1, memory 14 stores the encoded first pixel value until it is no longer needed for pixel reconstruction and display. During the time the encoded first pixel resides in memory 14, it may be accessed and decoded by a subsequent display processor via decompressor 16. Compressor 12 and decompressor 16 reside as a common integrated circuit. Memory 14 advantageously resides outside the integrated circuit, thereby allowing the size of memory 14 to be selected as needed to accommodate the signal processing requirements of a particular system. This results in manufacturing cost savings, e.g., in the case of a reduced cost consumer television receiver using a reduced resolution display requiring less frame memory for the MPEG decoder.

Figure 6:
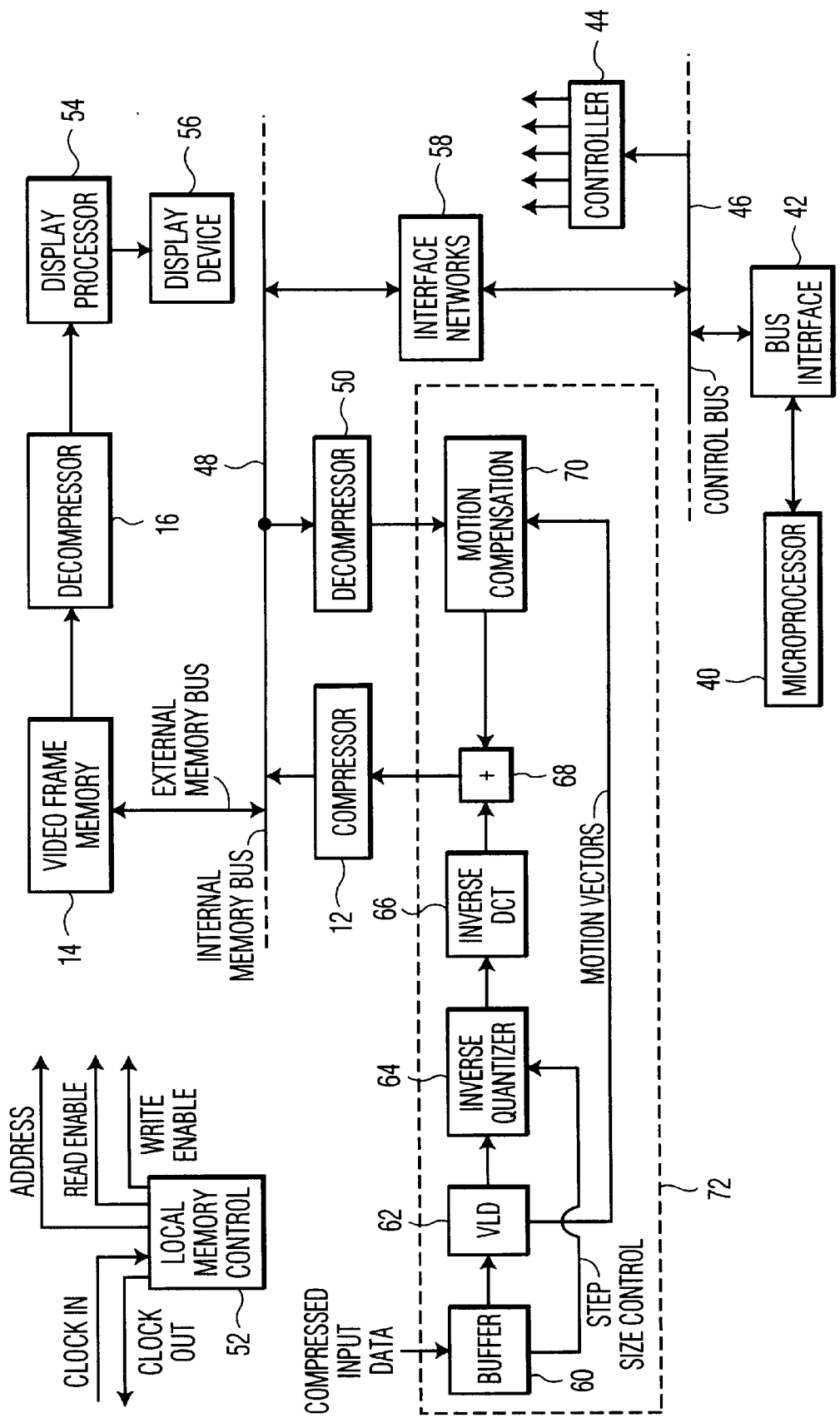
FIG. 6 shows a block diagram of an MPEG-compatible television system employing the present invention.

FIG. 6 illustrates portions of a practical digital signal processing system in a television receiver including apparatus according to the present invention as previously discussed. The digital television system of FIG. 6 is simplified so as not to burden the drawing with excessive detail. For example, not shown are FIFO input and output buffers associated with various elements, read/write controls, clock generator networks, and control signals for interfacing to external memories which can be of the extended data out type (EDO) or synchronous type (SDRAM).

Common elements in FIG. 1 and FIG. 6 have the same identifier. Elements in signal processor 72, except for compensator 70, correspond to elements found in the STi 3500A MPEG-2/CCIR 600 Video Decoder integrated circuit commercially available from SGS-Thomson Microelectronics. Motion compensation unit 70 may employ the STi 3220 Motion Estimator Processor integrated circuit available from the same manufacturer.

Briefly, the system of FIG. 6 includes microprocessor 40, bus interface unit 42 and controller 44 coupled to an internal control bus 46. In this example, microprocessor 40 is located external to the integrated circuit containing MPEG decoder 72. A 192 bit-wide internal memory bus 48 is a conduit for data to and from compressor 12, similar decompressors 16 and 50, and external frame memory 14. Units 12, 16 and 50 receive compression and decompression factor control signals from microprocessor 40 also partitions memory 14 into frame storage, buffer, and on-screen display bit-map sections for MPEG decoding and display processing. Also included is a local memory control unit 52, which receives Request inputs and provides Acknowledge outputs as well as memory Address output, Read Enable and Write Enable outputs. Memory control unit 52 generates real time address and control signals for controlling memory 14. Memory control unit 52 also provides output clock signals Clock In and Clock Out in response to input clock signals Clock In from a local clock generator (not shown). Microprocessor 40 partitions memory 14 into bit buffers, video frame store sections and frame storage buffers for MPEG decoding, and display processing and on-screen display maps.

Display processor 54 includes horizontal and vertical resampling filters as needed to convert a decompressed image format to a predetermined common format for display by an image reproducing display device 56. For example, the system may receive and decode image sequences corresponding to formats such as 525-line interlaced, 1125-line interlaced, or 720-line progressive scan. A television receiver will likely use a common display format for all receiver formats.

External interface networks 58 convey control and configuration information between the MPEG decoder and external microprocessor 40 in addition to input compressed video data for processing by the MPEG decoder. The MPEG decoder system resembles a coprocessor-processor for microprocessor 40; e.g., microprocessor 40 issues a decode command to the MPEG decoder for each frame to be decoded. The decoder locates the associated header information, which in turn is read by microprocessor 40. With this information microprocessor 40 issues data for configuring the decoder issues appropriate decode commands. Technical specification material for the SGS-Thomson STi 3500A and 3220 integrated circuit devices noted above provides additional information concerning such manner of MPEG decoder operation.

Microprocessor 40 conveys mode control data, programmed by the receiver manufacturer, to memory controller 52 for controlling the operation of multiplexer 32 (FIG. 2) and demultiplexer 34 (FIG. 4), and for establishing the compression/decompression factors for units 12, 16, and 50 as required. The disclosed system can be used with all Profiles and Levels of the MPEG specification in the context of various digital data processing schemes, such as may be associated with terrestrial broadcast, cable and satellite transmission systems, for example.

FIG. 6 also depicts a portion of a digital video signal processor 72 such as may be found in a television receiver for processing an input high definition video signal. Signal processor 72 includes a conventional MPEG decoder constituted by blocks 60, 62, 64, 66, 68 and 70 with frame memory 14. Ang, et al. "Video Compression Makes Big Gains," *IEEE Spectrum*, October, 1991, describes an example of the operation of an MPEG encoder and decoder.

Signal processor 72 receives a controlled data stream of MPEG coded data from a preceding input processor (not shown), e.g., a transport decoder which separates data packets after input signal demodulation. In this example, the received input data stream represents high definition image material (1920×1088 pixels) as specified in the Grand Alliance specification for the United States high definition terrestrial television broadcast system. The input data stream is in the form of data blocks representing 8×8 pixels. The data blocks represent compressed, coded intraframe and interframe information. The intraframe information comprises I-frame anchor frames. Generally, the interframe information comprises predictive motion coded residual information representing the image difference between adjacent picture frames. The interframe motion coding involves generating motion vectors representing the offset between a current block being processed and a block in a prior reconstructed image. The motion vector which represents the best match between the current and prior blocks is coded and transmitted. Also, the difference (residual) between each motion-compensated 8×8 block and the prior reconstructed block is Discrete Cosine Transformed (DCT), quantized and variable-length coded (VLC) before being transmitted. Various publications, including Ang, et al., supra., describe motion-compensated coding processes in greater detail.

Buffer 60 accepts the input compressed pixel data blocks before being variable-length decoded by VLD 62. Buffer 60 exhibits a storage capacity of 1.75 Mbits in the case of a main level, main profile MPEG data stream. Inverse quantizer 64 and DCT 66 decompress decoded compressed data from VLD 62. Output data from DCT 66 is coupled to one input of adder 68.

A signal from buffer 60 controls the quantization step size of inverse quantizer 64 to assure smooth data flow. VLD 62 provides decoded motion vectors to motion compensation unit 70, as will be discussed. VLD 62 also produces an inter/intra frame mode select control signal as known (not shown for simplification). The operation performed by units 62, 64, and 66 are the inverse of corresponding operations of an encoder located at a transmitter.

By summing the residual image from unit 66 with predicted image data provided from the output of unit 70, adder 68 provides a reconstructed pixel based on the contents of video frame memory 14. When signal processor 72 has processed an entire frame of pixel blocks, frame memory 14 stores the resulting reconstructed image. In the interframe mode, motion vectors obtained from VLD 62 provide the location of the predicted blocks from unit 70.

The image reconstruction process involving adder 68, memory 14 and motion compensation unit 70 advantageously exhibits significantly reduced memory requirements due to the use of block compressor 12 prior to data storage in frame memory 14. The size of frame memory 14 may be reduced by up to fifty percent (50%), for example, when a 50% compression factor is used. Unit 50 performs the inverse function of unit 12, and is similar to decompressor 16 described above. Compressor 12 and decompressors 16 and 50 are constructed in accordance with the principles of the present invention as previously discussed and shown in FIGS. 1, 2, 4 and 5.

Figure 7:
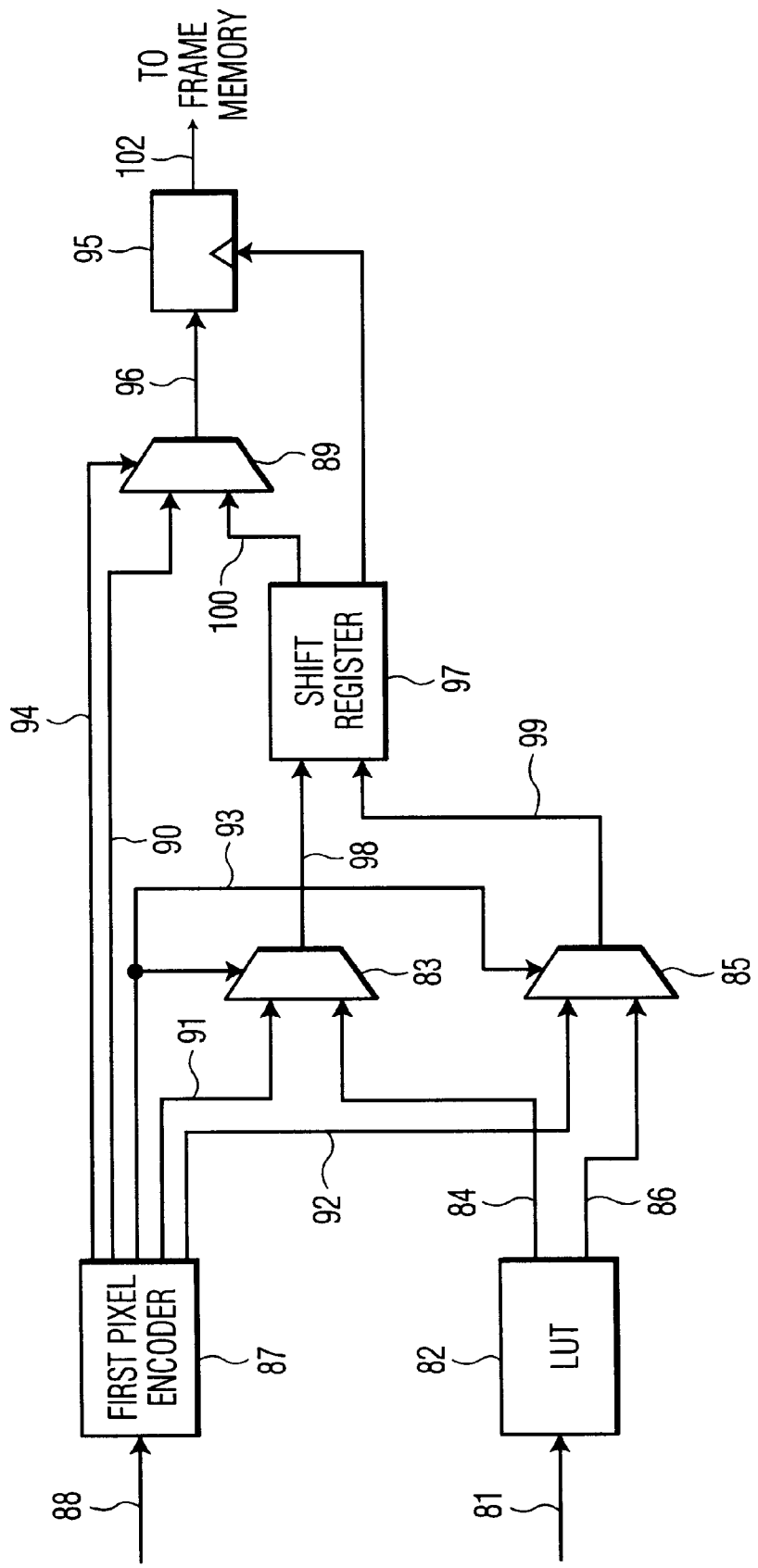
FIG. 7 shows a schematic block diagram of a compressor according to a preferred embodiment of the present invention.

Turning now to FIG. 7, a schematic block diagram of a compressor according to a preferred embodiment of the present invention is shown. The compressor of FIG. 7 can be utilized as the compressor 12 shown in FIG. 6. Similarly, the block diagrams of FIGS. 1 and 2 can be modified to include the compressor of FIG. 7. In the compression process of the present invention, overhead information is stored at the beginning of each compressed block of data. Individual pixels of a compressed block are represented by a variable number of bits, necessitating the use of a shift register to construct and decode the compressed block. Since it is desirable to minimize circuitry, it is therefore desirable to minimize the size of the shift register by minimizing the number of bits it is capable of shifting. It is also desirable to minimize the number of clock cycles used to compress and decompress a given block of data. A smaller shift register can be used if it is allowed multiple cycles to perform an operation. This, however, decreases the bandwidth of the system. For example, if a shift register requires an additional clock cycle to process an 8×8 luminance block, the bandwidth of the compressor is decreased to 64/65 (98%) of the original bandwidth. For a 4×4 chrominance block, the bandwidth would be decreased to 16/17 (94%) of the original bandwidth. The present invention provides a system that produces a pixel for each clock cycle.

In FIG. 7, quantized data 81 from the compression loop is input to a look-up table (LUT) 82 which produces a variable length code word, such as a Huffman code, in a known manner based on the degree of compression and the range of the given block. Here, the "range" is defined as the difference between the maximum and minimum pixel intensity values within the block. LUT 82 outputs the variable length code word to a multiplexer 83 via a connection line 84, and outputs data indicative of the length (in bits) of the variable length code word to a multiplexer 85 via a connection line 86. A first pixel encoder 87 receives pixel block data 88, and generates overhead bits representative of the range, the minimum pixel value for the block, and the difference between the minimum pixel value and the value of the first pixel. According to at least one embodiment, the overhead bits include at least eight bits for all ranges. First pixel encoder 87 forms these overhead bits into two groups. The first eight overhead bits are grouped together and output to a multiplexer 89 on a connection line 90. The remaining overhead bits of variable length are grouped together and output to multiplexer 83 via a connection line 91. First pixel encoder 87 also provides data indicative of the length (in bits) of these remaining overhead bits to multiplexer 85 via a connection line 92. First pixel encoder 87 controls multiplexers 83 and 85 via a control signal provided on a connection line 93, and also controls multiplexer 89 via a control signal provided on a connection line 94.

In operation, first pixel encoder 87 outputs the first eight overhead bits via connection line 90, and causes multiplexer 89 to output the same to a storage register 95 (e.g., flip-flop, FIFO) via connection line 96. At the same time, first pixel encoder 87 outputs the remaining overhead bits (if any) and the data indicative of their bit length via connection lines 91 and 92, respectively, and causes multiplexers 83 and 85 to output the same to a shift register 97 via connection lines 98 and 99, respectively. Shift register 97 is also known as a "barrel shifter", and is capable of shifting a plurality of bits in a single shifting operation. Multiplexers 83 and 85 also output the variable length code word and the data indicative of its bit length to the shift register 97 via connection lines 98 and 99, respectively. Shift register 97 concatentates the variable length code word and the remaining overhead bits with previously compressed data. Whenever the shift register 97 contains at least eight bits of data, this data is shifted into storage register 95 via connection lines 100 and 96, and multiplexer 89. Shift register 97 controls storage register 95 via a control signal provided on a connection line 101. Outputs from storage register 95 are provided via connection line 102 to a frame memory, such as the frame memory 14 of FIGS. 1 and 6. In this manner, all of the overhead bits and the first pixel data are compressed and concatenated into the output bitstream in one clock cycle. On the next clock cycle, the variable length codeword representing the second pixel is produced by LUT 82 and processed.

The decompression (which may be performed by decompressor 50 of FIG. 6) is executed in a similar but inverse manner, and uses the same components as shown in FIG. 7. As in the compression, during decompression, the first eight overhead bits are stripped away before the shift register so that only the remaining overhead bits and pixel data are introduced into the shift register.

As described above, by providing the first eight overhead bits directly to the output and not passing them through the shift register, the present invention advantageously preserves system bandwidth without requiring additional circuitry.

Variations and modifications of the present invention are possible, given the above description. However, all variations and modifications which are obvious to those skilled in the art to which the present invention pertains are considered to be within the scope of the present invention.

What is claimed is:

1. In a video processing device, circuitry comprising:

an encoder for generating first and second groups of overhead bits, the first group comprising a fixed number of overhead bits and the second group comprising a variable number of overhead bits, said overhead bits comprising data representing (a) a difference between maximum and minimum pixel values within a block of pixels, (b) a minimum pixel value within the block of pixels, and (c) a difference between the minimum pixel value and a first pixel value within the block of pixels;

a shift register for receiving pixel data from a data source, receiving the second group of overhead bits from the encoder, and providing output of the pixel data and the second group of overhead bits; and a multiplexer for receiving the pixel data and the second group of overhead bits from the shift register, receiving the first group of overhead bits from the encoder, and providing output of the pixel data and the first and second groups of overhead bits.

2. The circuitry of claim 1, further comprising an output register for receiving the pixel data and the first and second groups of overhead bits from the multiplexer.

3. The circuitry of claim 1, wherein the multiplexer provides outputs in response to a control signal generated by the encoder.

4. The circuitry of claim 1, wherein the shift register provides outputs whenever eight bits are accummulated therein.

5. The circuitry of claim 1, wherein the data source comprises a look-up table.

6. The circuitry of claim 1, wherein a single pixel represented by the pixel data is processed during a single clock cycle.

7. The circuitry of claim 1, wherein the first group of overhead bits includes eight bits.

8. A method for processing data in a video processing device, comprising the steps of:

generating pixel data;

generating first and second groups of overhead bits, the first group comprising a fixed number of overhead bits and the second group comprising a variable number of overhead bits, said overhead bits comprising data representing (a) a difference between maximum and minimum pixel values within a block of pixels, (b) a minimum pixel value within the block of pixels, and (c) a difference between the minimum pixel value and a first pixel value within the block of pixels;

transmitting the pixel data and the second group of overhead bits to an output register by passing the pixel data and the second group of overhead bits through a shift register; and transmitting the first group of overhead bits to the output register without passing the first group of overhead bits through the shift register.

9. The method of claim 8, wherein the first group of overhead bits includes eight bits.

10. The method of claim 8, wherein a single pixel represented by the pixel data is processed during a single clock cycle.

* * * * *